United States Patent
Qin et al.

(10) Patent No.: US 8,826,348 B2
(45) Date of Patent: Sep. 2, 2014

(54) SYSTEM AND METHOD FOR WIRELESS COMMUNICATION OF UNCOMPRESSED VIDEO HAVING A RELAY DEVICE FOR POWER SAVING

(75) Inventors: Xiangping Qin, San Jose, CA (US); Harkirat Singh, Santa Clara, CA (US); Huai-Rong Shao, Santa Clara, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 798 days.

(21) Appl. No.: 11/947,694

(22) Filed: Nov. 29, 2007

(65) Prior Publication Data

US 2008/0134271 A1 Jun. 5, 2008

Related U.S. Application Data

(60) Provisional application No. 60/872,936, filed on Dec. 4, 2006.

(51) Int. Cl.
*H04N 7/173* (2011.01)

(52) U.S. Cl.
USPC .............. 725/96; 725/82; 725/91; 725/93

(58) Field of Classification Search
None
See application file for complete search history.

(56) References Cited

U.S. PATENT DOCUMENTS

| | | | |
|---|---|---|---|
| 5,577,266 A | 11/1996 | Takahisa et al. | |
| 5,606,725 A * | 2/1997 | Hart | 725/131 |
| 5,991,279 A | 11/1999 | Haugli et al. | |
| 6,212,398 B1 | 4/2001 | Roberts et al. | |
| 6,363,267 B1 | 3/2002 | Lindskog et al. | |
| 6,532,228 B1 | 3/2003 | Burgess et al. | |
| 6,741,836 B2 | 5/2004 | Lee et al. | |
| 6,774,926 B1 * | 8/2004 | Ellis et al. | 348/14.01 |
| 6,804,542 B1 | 10/2004 | Haartsen | |
| 6,829,493 B1 | 12/2004 | Hunzinger | |
| 6,871,078 B2 * | 3/2005 | Nishioka et al. | 455/522 |
| 6,934,566 B2 | 8/2005 | Kang et al. | |
| 6,963,764 B2 | 11/2005 | Jamieson et al. | |

(Continued)

FOREIGN PATENT DOCUMENTS

| | | | |
|---|---|---|---|
| EP | 1473870 A2 | 11/2004 |
| EP | 1597895 A2 | 11/2005 |

(Continued)

OTHER PUBLICATIONS

FreshNews.com, SiBEAM Receives Equity Investment from Best Buy, http://freshnews.com/print/node/261440, Jan. 4, 2010, 2 pages.

(Continued)

*Primary Examiner* — Cai Chen
(74) *Attorney, Agent, or Firm* — Kenneth L. Sherman, Esq.; Michael Zarrabian, Esq.; Sherman & Zarrabian LLP (57) ABSTRACT

An apparatus and method for achieving power saving for a portable device in a wireless network for transmitting audio/video (A/V) data is disclosed. An optimal transmit power level is selected by transmitting multiple probe messages by a portable device at increasing transmit power levels until a response to one of the probe messages is received within a preset allowed response time. A relay node is selected by a portable device for receiving compressed A/V data, uncompressing the compressed A/V data, and transmitting the uncompressed A/V data to an intended receiver.

43 Claims, 9 Drawing Sheets

(56) References Cited

U.S. PATENT DOCUMENTS

| | | | |
|---|---|---|---|
| 6,981,045 B1 * | 12/2005 | Brooks | 709/226 |
| 6,993,393 B2 | 1/2006 | Von Arx et al. | |
| 7,061,879 B2 | 6/2006 | Oprescu-Surcobe et al. | |
| 7,072,697 B2 | 7/2006 | Lappetelainen et al. | |
| 7,245,631 B2 | 7/2007 | Sano et al. | |
| 7,277,417 B2 | 10/2007 | Palm et al. | |
| 7,289,804 B2 | 10/2007 | Kim | |
| 7,295,827 B2 | 11/2007 | Liu et al. | |
| 7,337,337 B2 | 2/2008 | Hong et al. | |
| 7,349,355 B2 | 3/2008 | Sengupta et al. | |
| 7,394,782 B2 | 7/2008 | Davis | |
| 7,412,265 B2 * | 8/2008 | Chen et al. | 455/574 |
| 7,466,979 B2 | 12/2008 | Ohlenbusch et al. | |
| 7,480,265 B2 | 1/2009 | Cromer et al. | |
| 7,551,948 B2 | 6/2009 | Meier et al. | |
| 7,653,017 B2 | 1/2010 | Huylebroeck | |
| 7,693,117 B2 | 4/2010 | Benveniste | |
| 7,719,482 B2 | 5/2010 | Unger | |
| 7,801,092 B2 | 9/2010 | Meier | |
| 7,912,467 B2 | 3/2011 | Yoon et al. | |
| 7,916,687 B2 | 3/2011 | Deshpande et al. | |
| 7,961,660 B2 | 6/2011 | Beach | |
| 7,965,837 B2 | 6/2011 | Kawasaki et al. | |
| 8,064,594 B2 | 11/2011 | Mohan et al. | |
| 8,150,424 B2 | 4/2012 | Ohlenbusch et al. | |
| 8,180,408 B2 | 5/2012 | Frenger et al. | |
| 8,441,972 B2 | 5/2013 | Kohmann et al. | |
| 8,451,759 B2 | 5/2013 | Kohmann et al. | |
| 2002/0152307 A1 * | 10/2002 | Doyle et al. | 709/225 |
| 2003/0055971 A1 * | 3/2003 | Menon | 709/226 |
| 2003/0118014 A1 * | 6/2003 | Iyer et al. | 370/389 |
| 2004/0068748 A1 * | 4/2004 | Currivan et al. | 725/111 |
| 2004/0072573 A1 * | 4/2004 | Shvodian | 455/450 |
| 2004/0218556 A1 | 11/2004 | Son et al. | |
| 2004/0253996 A1 | 12/2004 | Chen et al. | |
| 2005/0009578 A1 | 1/2005 | Liu | |
| 2005/0014464 A1 * | 1/2005 | Larsson | 455/11.1 |
| 2005/0233789 A1 | 10/2005 | Maekawa | |
| 2005/0249137 A1 | 11/2005 | Todd et al. | |
| 2006/0014557 A1 * | 1/2006 | Rajkotia et al. | 455/522 |
| 2006/0129855 A1 | 6/2006 | Rhoten et al. | |
| 2006/0270438 A1 * | 11/2006 | Choi | 455/522 |
| 2007/0002766 A1 * | 1/2007 | Park et al. | 370/254 |
| 2007/0038346 A1 | 2/2007 | Ehrlich et al. | |
| 2007/0060152 A1 | 3/2007 | Sakamoto et al. | |
| 2007/0118864 A1 * | 5/2007 | Champion et al. | 725/81 |
| 2007/0237122 A1 | 10/2007 | Liu et al. | |
| 2007/0297438 A1 | 12/2007 | Meylan et al. | |
| 2008/0034393 A1 * | 2/2008 | Crayford | 725/87 |
| 2008/0130540 A1 | 6/2008 | Singh et al. | |
| 2008/0130543 A1 | 6/2008 | Singh et al. | |
| 2009/0279464 A1 | 11/2009 | Kakani et al. | |
| 2012/0195245 A1 | 8/2012 | Frenger et al. | |

FOREIGN PATENT DOCUMENTS

| | | |
|---|---|---|
| JP | 2004320769 A | 11/2004 |
| KR | 1020060057515 A | 6/2008 |
| WO | WO 2006/083559 A1 | 9/2005 |
| WO | WO 2006/101801 | 9/2006 |

OTHER PUBLICATIONS

IEEE Wireless LAN Edition (2003), A compilation based on IEEE Std 802.11TM—1999 (R2003) Amendment 4: Further Higher Data Rate Extension in the 2.4 GHz Band, pp. 1-77.

Jeong et al., Performance of Adaptive Sleep Period Control for Wireless Communications Systems. IEEE Transactions on Wireless Communications, November 2006, 5(11): 3012-3016.

Jun et al., Affinity-based Power Saving MAC Protocol in Ad Hoc Networks, IEEE 3rd Proceedings of the Int'l Conference on Pervasive Computing and Communication: IEEE PerCom 2005, pp. 363-372.

International Search Report dated Mar. 14, 2008 for PCT/KR2007/006222, filed Dec. 4, 2007.

International Preliminary Report on Patentability and Written Opinion dated Jun. 10, 2009 for PCT/KR2007/006222, filed Dec. 4, 2007.

International Search Report dated Mar. 11, 2008 for PCT/KR2007/006223, filed Dec. 4, 2007.

International Preliminary Report on Patentability and Written Opinion dated Jun. 10, 2009 for PCT/KR2007/006223, filed Dec. 4, 2007.

International Search Report dated Mar. 17, 2008 for PCT/KR2007/006227, filed Dec. 4, 2006.

International Preliminary Report on Patentability and Written Opinion dated Jun. 10, 2009 for PCT/KR2007/006227, filed Dec. 4, 2007.

Hachman, "CE Giants back Amimon's Wireless HDTV Tech," PCMAG.com, 1 page (Jul. 23, 2008).

IEEE 802.15.3: Wireless Medium Access Control (MAC) and Physical Layer (PHY) Specifications for High Rate Wireless Personal Area Networks (WPANs), Sep. 29, 2003.

"NEC develops compact millimeter-wave transceiver for uncompressed HDTV signal transmission," *NE Asia Online*, Apr. 5, 2005, (Downloaded from http://neasia.nkkeibp.com/topstory/000913 on Sep. 29, 2006.).

WirelessHD Specification Version 1.0 Overview, Oct. 9, 2007, 77 pages.

U.S. Final Office Action for U.S. Appl. No. 11/946,775 mailed Mar. 23, 2011.

Korean Office Action dated Sep. 30, 2009 issued in Korean Patent Application No. 10-2007-0125179, Korean Intellectual Property Office, pp. 1-7, Seo-gu, Daejeon, Republic of Korea (Machine-generated English-language translation attached, pp. 1-3).

Korean Office Action dated Dec. 31, 2009 issued in Korean Patent Application No. 10-2007-0125179, Korean Intellectual Property Office, pp. 1-3, Seo-gu, Daejeon, Republic of Korea (Machine-generated English-language translation attached, p. 1).

Korean Office Action dated Sep. 28, 2009 issued in Korean Patent Application No. 10-2007-0125180, Korean Intellectual Property Office, pp. 1-6, Seo-gu, Daejeon, Republic of Korea (Machine-generated English-language translation attached, pp. 1-3).

Korean Office Action dated Dec. 30, 2009 issued in Korean Patent Application No. 10-2007-0125180, Korean Intellectual Property Office, pp. 1-3, Seo-gu, Daejeon, Republic of Korea (Machine-generated English-language translation attached, p. 1).

U.S. Non-Final Office Action for U.S. Appl. No. 11/946,775 mailed Oct. 18, 2010.

U.S. Notice of Allowance for U.S. Appl. No. 11/946,775 mailed Aug. 30, 2013.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

U.S. Office Action dated Jun. 24, 2010 in U.S. Appl. No. 11/868,364, filed Oct. 5, 2007.

* cited by examiner

SYSTEM AND METHOD FOR WIRELESS COMMUNICATION OF UNCOMPRESSED VIDEO HAVING A RELAY DEVICE FOR POWER SAVING

CROSS-REFERENCE TO RELATED APPLICATIONS

This application claims the benefit under 35 U.S.C. 119(e) of U.S. Provisional Application No. 60/872,936, filed on Dec. 4, 2006, which is incorporated by reference in its entirety.

BACKGROUND OF THE INVENTION

1. Field of the Invention

The present invention relates to wireless transmission of video information, and in particular, to wireless communication of uncompressed video having a relay device for power saving.

2. Description of the Related Technology

With the proliferation of high quality video, an increasing number of electronic devices, such as consumer electronic devices, utilize high definition (HD) video which can require multiple gigabit per second (Gbps) or more in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless personal area network (WPAN) and similar technologies can suffer from throughput not high enough to support HD AV applications.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of selecting an optimal transmit power level for audio/video (A/V) data transmissions by a portable device in a wireless network, the method comprising transmitting a first probe message one or more times at a first transmit power level; transmitting a second probe message one or more times at a second transmit power level that is greater than the first transmit power level, if a response to the first probe message is not received within a preset allowed response time; receiving a response to the second probe message; and selecting an optimal transmit level for subsequent A/V data transmission based at least partly on the second transmit power level.

In another embodiment, there is a portable wireless communications apparatus for audio/video (A/V) data transmission in a wireless network, the apparatus comprising a processor configured to select an optimal transmit power level at least partly by transmitting a plurality of probe messages transmitted at increasing discrete transmit power levels until a response message for one of the probe messages is received within a preset allowed response time, a transmitter configured to wirelessly transmit the plurality of probe messages, a receiver configured to wirelessly receive the response message from a responding station in the WIRELESS NETWORK, and a memory for storing a value or a bit corresponding to the selected optimal transmit power level.

In another embodiment, there is a method of audio/video (A/V) data communication between a portable device and an intended receiver in a wireless network, the method comprising preparing a data packet that includes compressed A/V data, selecting a relay node capable of receiving the compressed data and relaying uncompressed A/V data to the intended receiver in the wireless network, and transmitting the data packet that includes the compressed A/V data to the relay node.

In another embodiment, there is a portable wireless communications apparatus for audio/video (A/V) data transmission in a wireless network, the apparatus comprising a processor configured to prepare a data packet that includes compressed A/V data, select a relay node capable of receiving the compressed data and relaying uncompressed A/V data to the intended receiver, and transmit the compressed A/V data to the relay node; and a transmitter configured to wirelessly transmit the data packet that includes the compressed A/V data to the relay node.

In another embodiment, there is a method of audio/video (A/V) data communication between a portable device and an intended receiver via a relay node in a wireless network, the method comprising accepting a request from a portable device to become a relay node for relaying A/V data between the portable device and an intended receiver, receiving compressed A/V data from the portable device, uncompressing the compressed A/V data by the relay node, and transmitting the uncompressed A/V data to the intended receiver.

DETAILED DESCRIPTION OF CERTAIN INVENTIVE EMBODIMENTS

The following detailed description is directed to certain sample embodiments of the invention. However, the invention can be embodied in a multitude of different ways as defined and covered by the claims. In this description, reference is made to the drawings wherein like parts are designated with like numerals throughout.

Embodiments include systems and methods of wireless communication of video data will be described. Video data can include one or more of motion video, still images, or any other suitable type of video data. In particular, various embodiments representing wireless communication of video data having a relay device for power saving will be described.

Figure 1:
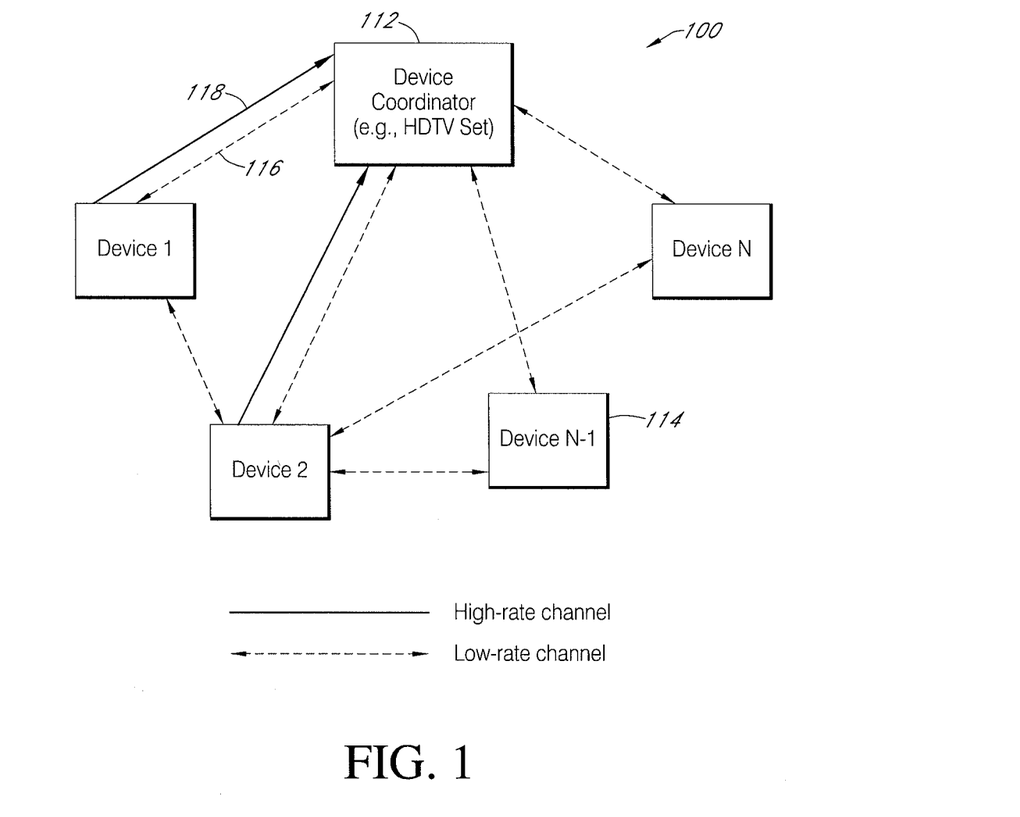
FIG. 1 is a functional block diagram of an exemplary configuration of a wireless video area network (WVAN) that implements uncompressed HD video transmission between wireless devices according to one embodiment of the system and method.

Exemplary implementations of the embodiments in a wireless high definition (HD) audio/video (A/V) system will now be described. FIG. 1 shows a functional block diagram of a wireless local area network (WLAN) 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple client devices or A/V stations 114 (e.g., Device 1 ... Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (referred to as "receiver 112"), and the station 114 is a sender of the video information (referred to as "sender 114"). For example, the receiver 112 can be a sink of audio and/or video data (A/V data) implemented, such as, in an HDTV set in a home wireless network environment which is a type of WPAN. The sender 114 can be a source of uncompressed A/V data. Examples of the sender 114 include a set-top box (STB), a digital video disk (DVD) player or recorder, a digital camera, a camcorder, and so forth.

Figure 2:
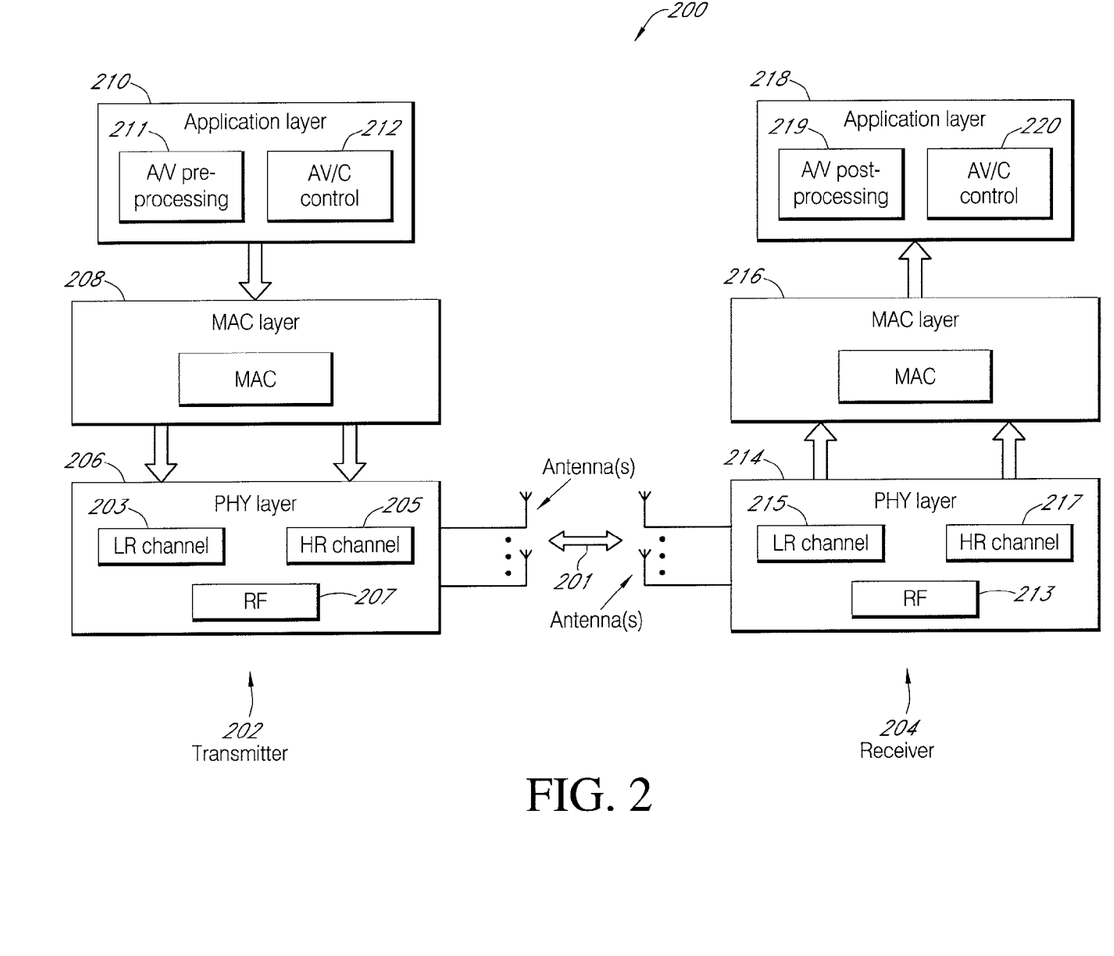
FIG. 2 is a functional block diagram of an example communication system for transmission of uncompressed HD video over a wireless medium, according to certain embodiments of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
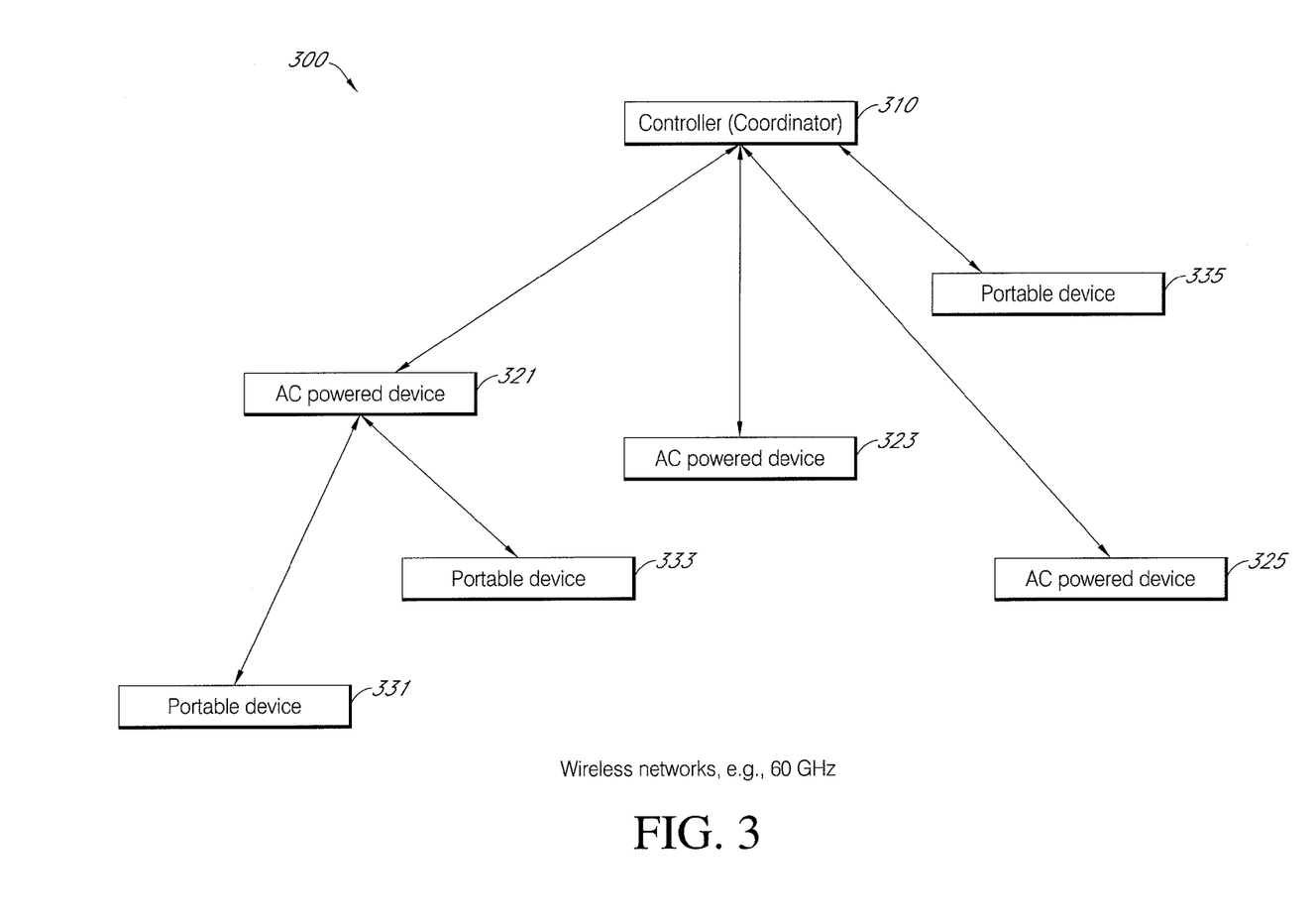
FIG. 3 is a functional block diagram illustrating an example of a wireless network that includes portable mobile devices according to certain embodiments.

FIG. 3 is a functional block diagram illustrating an example of a wireless network that includes portable mobile devices according to certain embodiments. In the example, the wireless network is a wireless personal area network (WPAN). The WPAN 300 comprises a coordinator (controller) 310, a first AC powered device 321, a second AC powered device 323, and a third AC powered device 325, and a first portable (mobile) device 331, a second portable device 333, and a third portable device 335. In the example, the portable devices 331, 333, and 335 are capable of storing and transmitting A/V data and are battery-operated. Examples of such portable devices 331, 333, 335 include a camcorder, a portable media player (PMP), a MPEG-1 audio layer 3 (MP3) player, and other digital media devices with wireless communications capabilities.

In the particular embodiment shown, the coordinator 310 communicates with the AC powered devices 321, 323; at least one of the AC powered devices 321 communicates with portable devices 331, 333; and at least two portable devices 331, 333 communicate with the AC powered device or with the end device, e.g., the coordinator 310, via the first AC powered device 321 acting as a relay node. The end device refers to the intended receiver of the A/V data, and these two terms-the end device and the intended receiver-will be used exchangeably. The system and method of relaying A/V data between a portable device and an end device, e.g., a coordinator, will be described in detail below in Section II. The third portable device 335 communicates directly with the end device, e.g., the coordinator 310.

I. Gradual Power Incrementing Scheme and Device Discovery

In certain embodiments, transmit power levels of a portable device are set at a number of discrete values, e.g., 0 dBm, 2 dBm, . . . , 10 dBm, ranging from a minimum level to a maximum level. To save power for the portable device which is typically battery-powered, it would be desirable to have the portable device communicate with an AC powered device in the WPAN using a minimum transmit power level.

Figure 4:
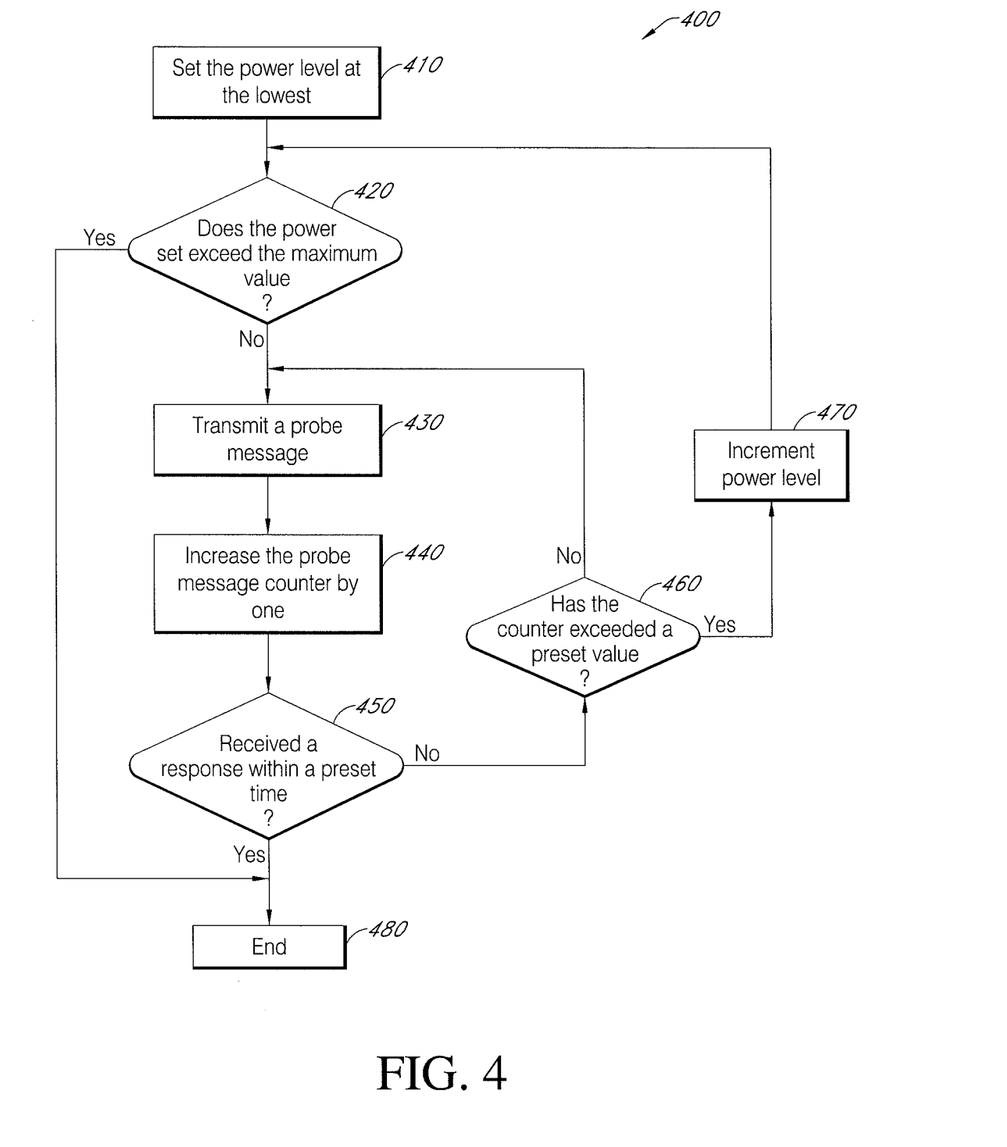
FIG. 4 is a flowchart illustrating an example process for the selection of an optimal transmit power level for wireless A/V data communication between a portable device and an AC powered device using a gradual power incrementing scheme according to certain embodiments.

FIG. 4 is a flowchart illustrating an example process 400 for the selection of an optimal transmit power level for wireless A/V data communication between a portable device and an AC powered device using a gradual power incrementing scheme according to certain embodiments. The selection process 400 starts at state 410, where a portable device 331, such as the first and the second portable devices 331, 333 shown in FIG. 3, sets the transmit power level at the lowest possible value, e.g., 0 dBm. Also, a probe message counter, that keeps track of the number of transmissions at a given transmit power level, is initialized to 0. The process then moves to state 420, where it is determined whether the presently set transmit power level exceeds a maximum power level. At this stage, with the transmit power level set at the minimum power level, e.g., 0 dBm, the process moves to state 430, where the portable device 331, 333 broadcasts or transmits a short probe packet or message at the minimum power level. When a portable device joins the network, it receives beacons from the coordinator. So this probe packet is broadcast during unreserved time, and a reservation schedule is normally included in the beacons. The process then moves to state 440, where the probe message counter is increased by one. The process then moves to state 450, where it is determined whether a response is received from an intended receiver or any AC powered device within a preset response time. If the answer is YES, the process ends with the transmit power level set at the minimum power level, e.g., 0 dBm at state 480.

In the example embodiment, if no response to the first probe message is received, a preset number of retransmissions of probe message at the same power level can be made. Only if no response is received after the preset number of transmissions, the transmit power level is incremented as described below. In the example embodiment, therefore, if the answer is NO (that is, no response is received by the portable device within the preset response time), the process moves to state 460, where it is determined whether the probe message counter exceeds the preset number of transmissions. If the answer is NO (the counter does not exceed the preset number), the process loops back the transmission loop comprising states 460, 430, 440, and 450. If the answer is YES (the counter exceeds the preset number), the process moves to state 470, where the transmit power level is incremented to a higher level and, then, loops back to state 420, where it is determined whether the presently set power level exceeds the maximum power level. If the power level exceeds the maximum level, the process exits at state 460 without making a further attempt to find an optimal transmit power level. If the power level does not exceed the maximum power level, the rest of the process involving transmission and possible retransmissions of probe messages described above is repeated. If a response is received for a transmitted or retransmitted probe message within the preset response time, the process ends with the portable device set to transmit at the presently set transmit power level at state 480. On the other hand, if a response is not received within the preset response time after the preset number of retransmissions, the process moves to state 470, where the transmit power level is again incremented, and the selection process repeats by looping back to state 420.

In summary, the selection process for the optimal transmit power level involves finding a minimum transmit power level within which a response can be drawn from an intended receiver or any AC powered device in the WPAN. The selection process can also be thought of as finding a minimum range within which either an intended receiver or any AC powered device that can potentially act as a relay node is found in the WPAN. In certain embodiments, the optimal transmit power level can be set slightly higher than the first transmit level which yielded the response to account for the statistical nature of the signal to noise (S/N) ratio.

The benefits of the gradual power incrementing scheme described above will be apparent to the one skilled in the art. For example, portable devices in many cases are placed close to the intended receiver, e.g., a DTV acting as the coordinator (which also happens to be an AC powered device). The portable device can be a battery-powered portable media player (PMP) mobile movie device located close to an external HDD device to upload or download a movie. By using the gradual power incrementing scheme described above, the power level can be set low enough to communicate with the intended receiver, achieving power-savings for the battery-powered portable device. In other cases, the portable device is not close to the intended receiver, but can be close to another AC powered device which can act as a relay node or station. By using the same power incrementing scheme, the power level of the portable device can be set low enough to communicate with the AC powered relay device, again achieving power-savings for the portable device.

II. A/V Data Transmission Via a Relay Node

Figure 5A:
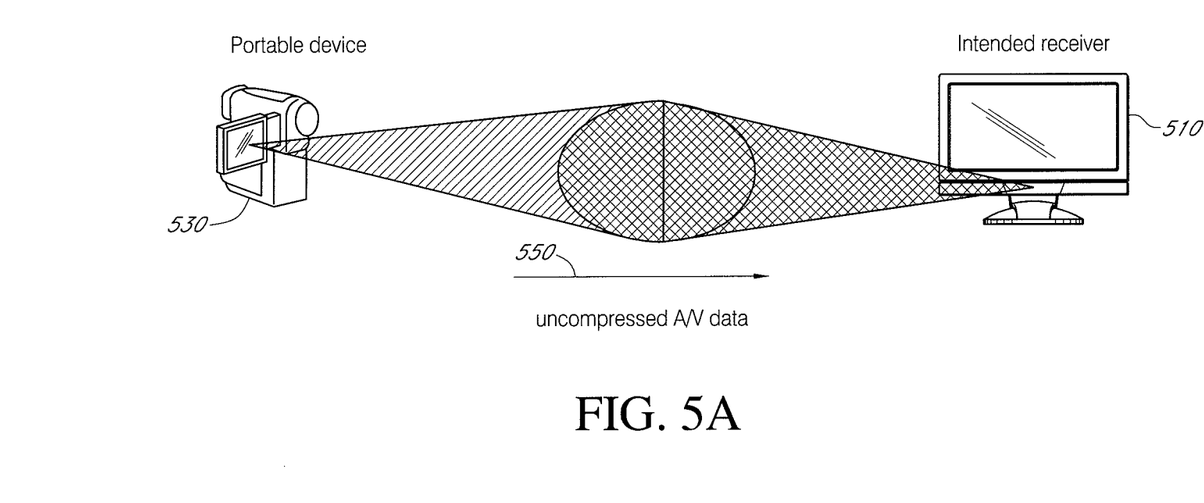
FIG. 5A is a schematic diagram illustrating an example of transmission of uncompressed A/V data from a portable device to an intended receiver without a relay node.

FIG. 5A is a schematic diagram illustrating an example of transmission of uncompressed A/V data from a portable device to an intended receiver without a relay node and is included primarily for the purpose of illustrating the advantages of certain embodiments of transmission of A/V data via a relay node described with reference to FIG. 5B below. In the example shown in FIG. 5A, the portable device 530 is a camcorder, and the intended receiver 510 is a digital television (DTV) acting as a coordinator in the WPAN. In the example, the portable device 530 transmits uncompressed A/V data 550 directly to the intended receiver 510. In comparison to the size of compressed video data, which can be several Mbps, the size of the uncompressed A/V data can be several Gbps. In short, the size of uncompressed A/V data is substantially larger that that of compressed data. Therefore, the time required to transmit compressed A/V data is significantly smaller than the time required to transmit uncompressed A/V data. Of course, the portable device may transmit compressed A/V data directly to the intended device. However, the intended device may not have the encoder or decoder to process the compressed video, and the quality perceived by a user watching compressed video may not be as good as the quality perceived by the same user watching uncompressed video. On the other hand, the high quality user experience in watching uncompressed video comes at the cost of more battery power consumed by the portable device 530 for having to transmit the uncompressed A/V for a longer period of time.

Figure 5B:
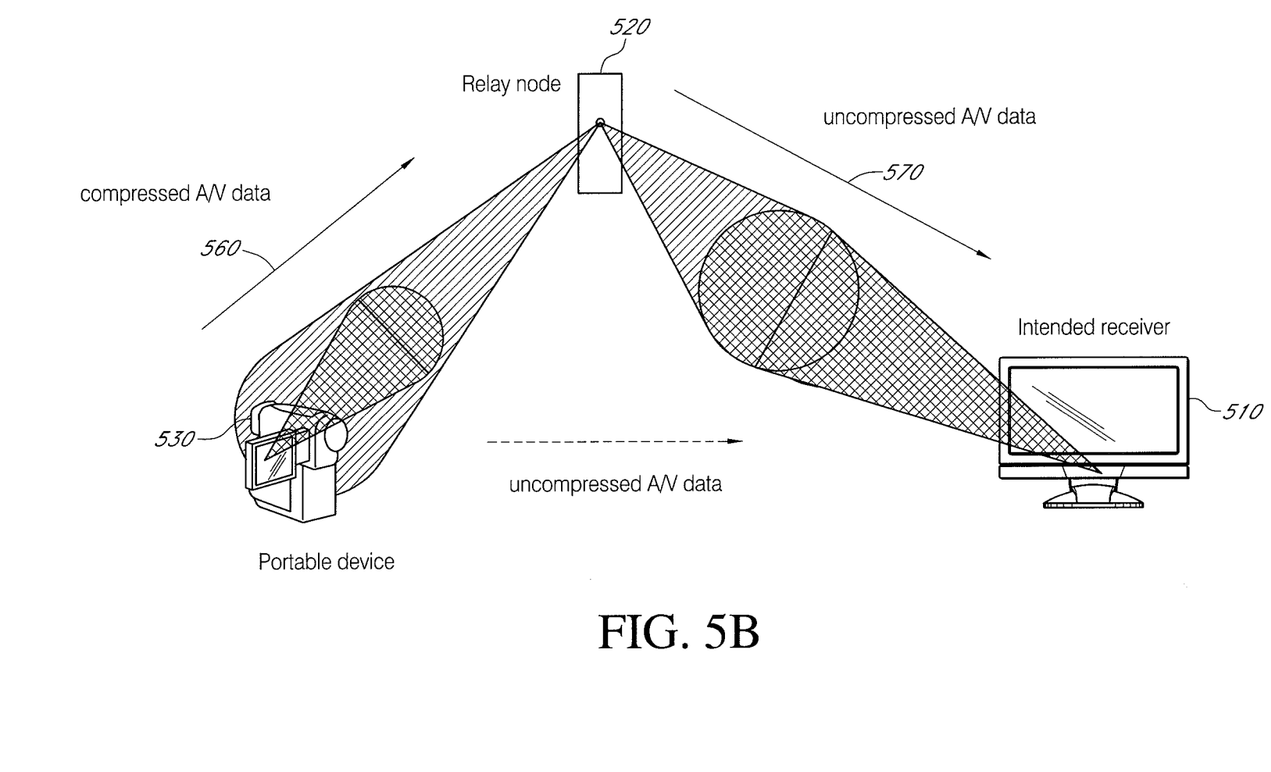
FIG. 5B is a schematic diagram illustrating an example of transmitting A/V data from a portable device to an intended receiver via a relay node according to certain embodiments.

FIG. 5B is a schematic diagram illustrating an example of transmitting A/V data from a portable device 530 to an intended receiver 510 via a relay node 520 according to certain embodiments. In the example shown, the portable device 530 is a camcorder, but it can be any other portable device, such as PMP or MP3 player, that is capable of wirelessly transmitting A/V data stream. Similarly, in the example, the intended receiver 510 is a digital television (DTV) acting as a coordinator, but it also can be any other device that is capable of wirelessly receiving A/V data stream. The intended receiver may not even be a coordinator in the WVAN. In the example, the relay node 520 is a personal computer (PC), but it can also be any other device capable of wirelessly receiving and transmitting A/V data stream and of decoding compressed A/V data.

In operation, the portable device 530 transmits compressed A/V data 560 to the relay node 520. The relay node 520, in turn, decodes or uncompresses the compressed A/V data and relays the uncompressed A/V data 570 to the intended receiver 510. Because the portable device 530 transmits compressed data, the transmission time is small compared to the transmission time required for transmission of uncompressed A/V data such as shown in FIG. 5A, thereby achieving power savings for the portable device 530. In addition, because the intended receiver 510, e.g., the DTV acting as a coordinator, receives uncompressed A/V stream, no decoder is required, and no processing delay is introduced in the intended receiver; and the user's experience of watching the video on the DTV is not compromised. In addition, in typical instances in which the relay node is located closer to the portable device than the intended receiver 510, the portable device can transmit A/V data at a lower power level than if the portable device had communicated directly with the intended device without the relay node as shown in FIG. 5A, thereby achieving additional power-savings for the portable device. In certain embodiments, the portable device can transmit uncompressed A/V data stream to the relay node; and the relay node can relay the uncompressed A/V data to the intended receiver without decoding. In these embodiments, while the portable device cannot take advantage of power savings associated with the shortened transmission time, some power savings can still accrue to the portable device because it can transmit the uncompressed A/V data to the relay node at a lower transmit power level due to the proximity of the relay node.

Figure 6A:
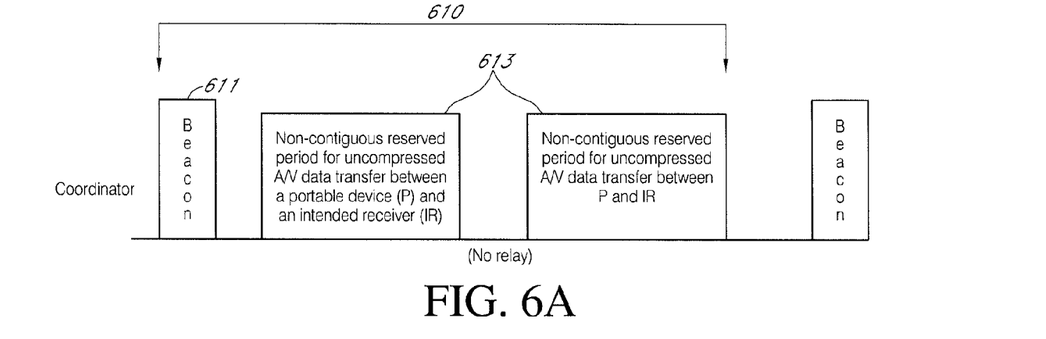
FIG. 6A is a timing diagram illustrating an example of transmitting uncompressed A/V data from a portable device to an intended receiver without a relay node, such as illustrated by FIG. 5A.

FIG. 6A is a timing diagram illustrating an example of transmitting uncompressed A/V data from a portable device 530 to an intended receiver 510 without a relay node, such as shown in FIG. 5A and described above. In the example shown, the uncompressed A/V data is carried by a current superframe 610. The current superframe 610 comprises a beacon 611, and one or more non-contiguous reserved periods 613 for the uncompressed A/V data transfer 550 between the portable device 530 and the intended receiver 510.

Figure 6B:
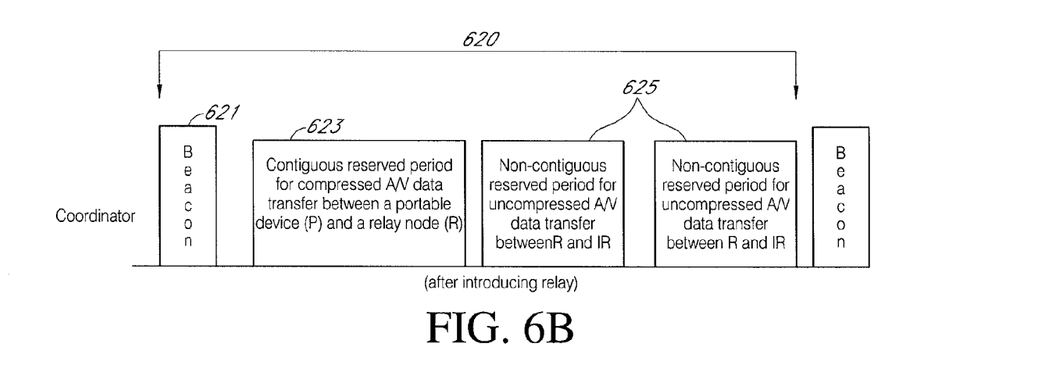
FIG. 6B is a timing diagram illustrating an example of relaying A/V data between a portable device and an intended receiver such as illustrated by FIG. 5B, according to certain embodiments.

FIG. 6B is a timing diagram illustrating an example of relaying A/V data between a portable device 530 and an intended receiver 510, such as shown in FIG. 5B and described above, according to certain embodiments. In the example, the A/V data is carried by a current superframe 620. The current superframe 620 comprises a beacon 621, a contiguous reserved period 623, and one or more non-contiguous reserved periods 625. In certain embodiments, the compressed A/V data transfer 560 between the portable device 530 and the relay node 520 takes place in the contiguous reserved period 623, while uncompressed A/V data transfer 570 between the relay node 520 and the intended receiver 510 takes place in the one or more non-contiguous reserved periods 625.

Figure 6C:
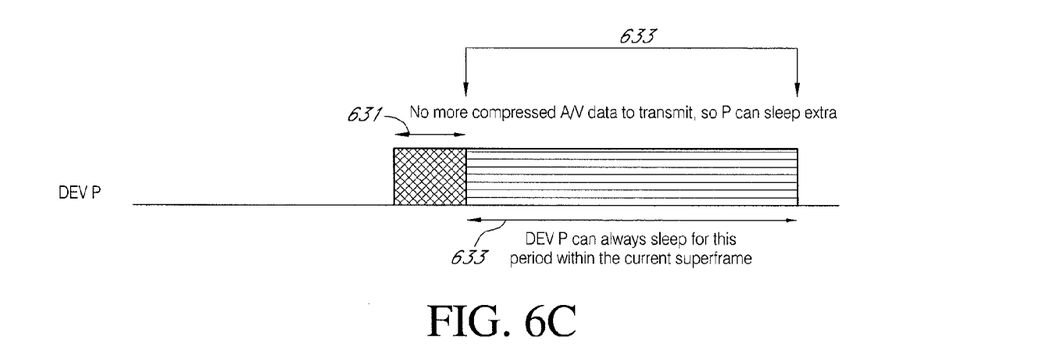
FIG. 6C is a timing diagram illustrating an example of a portable device going to sleep during a reserved period for A/V data transfer between the portable device and the relay node when the portable device has no further A/V data to transmit according to certain embodiments.

FIG. 6C is a timing diagram illustrating an example of a portable device going to sleep during a reserved period for A/V data transfer between the portable device and the relay node when the portable device has no further A/V data to transmit according to certain embodiments. As discussed above with reference to FIG. 6B, the portable device 530 transfers compressed A/V data to the relay node 520 in the contiguous reserved period 623. The portable device typically goes to a power-saving sleep state during the remainder of the superframe 633, which includes the one or more non-contiguous reserved periods 625. In some cases, the portable device may complete the compressed A/V data transfer before the contiguous reserved period 623 expires. In such instances, the portable device may additionally sleep during the remainder 631 of the contiguous reserved period, thereby achieving further power savings for the portable device 330.

Figure 7:
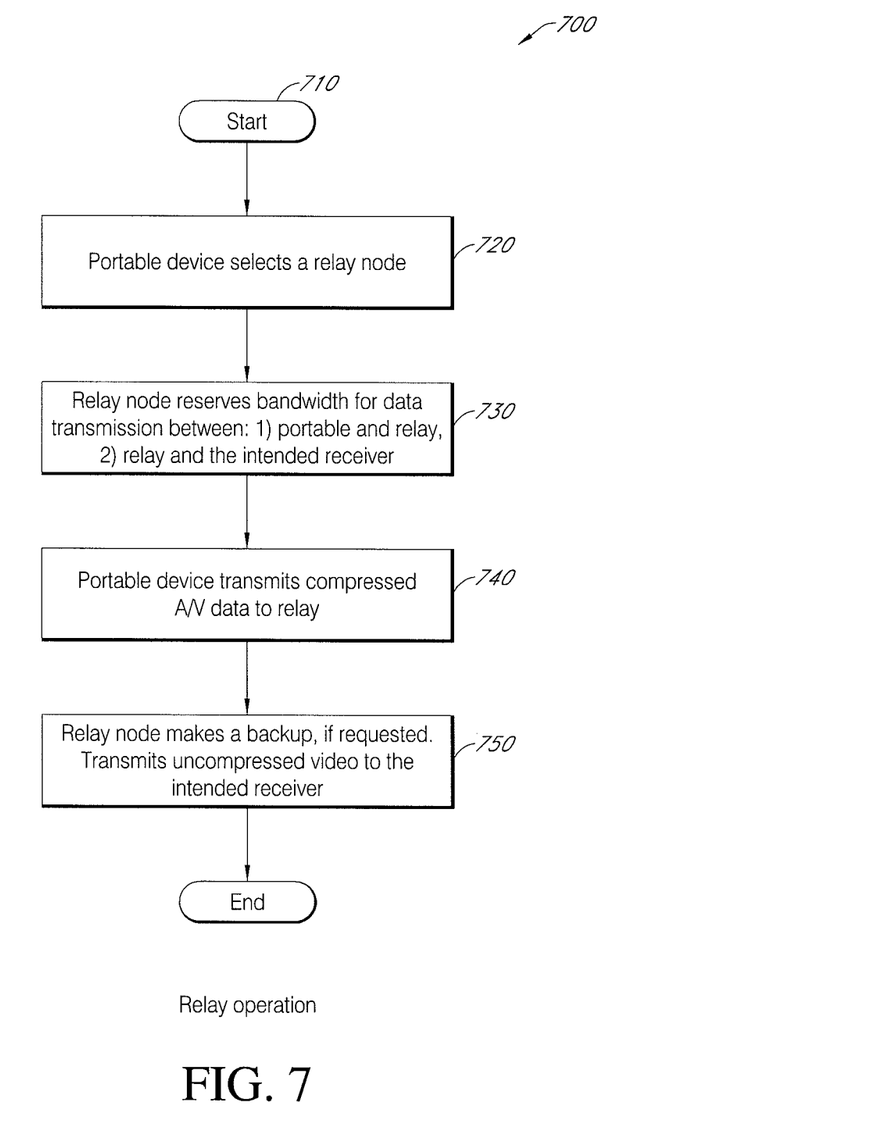
FIG. 7 is a flowchart illustrating an example process for relaying of A/V data between a portable device and an intended receiver via a relay station or node such as illustrated by FIG. 5B and FIG. 6B according to certain embodiments.

FIG. 7 is a flowchart illustrating an example process for relaying of A/V data between a portable device and an intended receiver via a relay station or node such as illustrated by FIG. 5B and FIG. 6B according to certain embodiments. The process 700 starts at state 710 where the portable device 530, e.g., a camcorder, has some A/V data to transmit to an intended receiver, e.g., a DTV. At state 720, the portable device selects a relay node 520. The selection is described in detail with reference to FIG. 8 below. After the relay node is selected, the process moves to state 730, where the relay node reserves bandwidth or channel time for data transmission between: 1) the portable device and the relay node; and 2) the relay node and the intended receiver. The process then moves to state 740, where the portable device, using the reserved bandwidth, transmits the compressed A/V data 560 to the relay node, such as illustrated in FIG. 5B. In certain embodiments, the transmit power level of data transmission between the portable device and the relay node is optimally adjusted such that the portable device can communicate with the relay node, as discussed above in Section I with reference to FIG. 4. The process then moves to state 750, where the relay node, after receiving the compressed A/V data, decodes or uncompresses the received compressed A/V data and transmits the uncompressed A/V data to the intended receiver. At this state, the relay node can also make a backup of the A/V data if required. In certain embodiments, the reception of the compressed A/V data and the transmission of the uncompressed version of the A/V data after decoding are done in a real-time, meaning that the steps are performed during the same superframe cycle. Therefore, although using a relay node, the A/V data application is still real time. The portable device plays the A/V data and the user can watch it at the end device, without knowing there is a relay device relaying the A/V data. In other embodiments, there can be a delay of one or more superframe cycles between the reception of compressed A/V data and the transmission of the uncompressed version of the A/V data after decoding.

Figure 8:
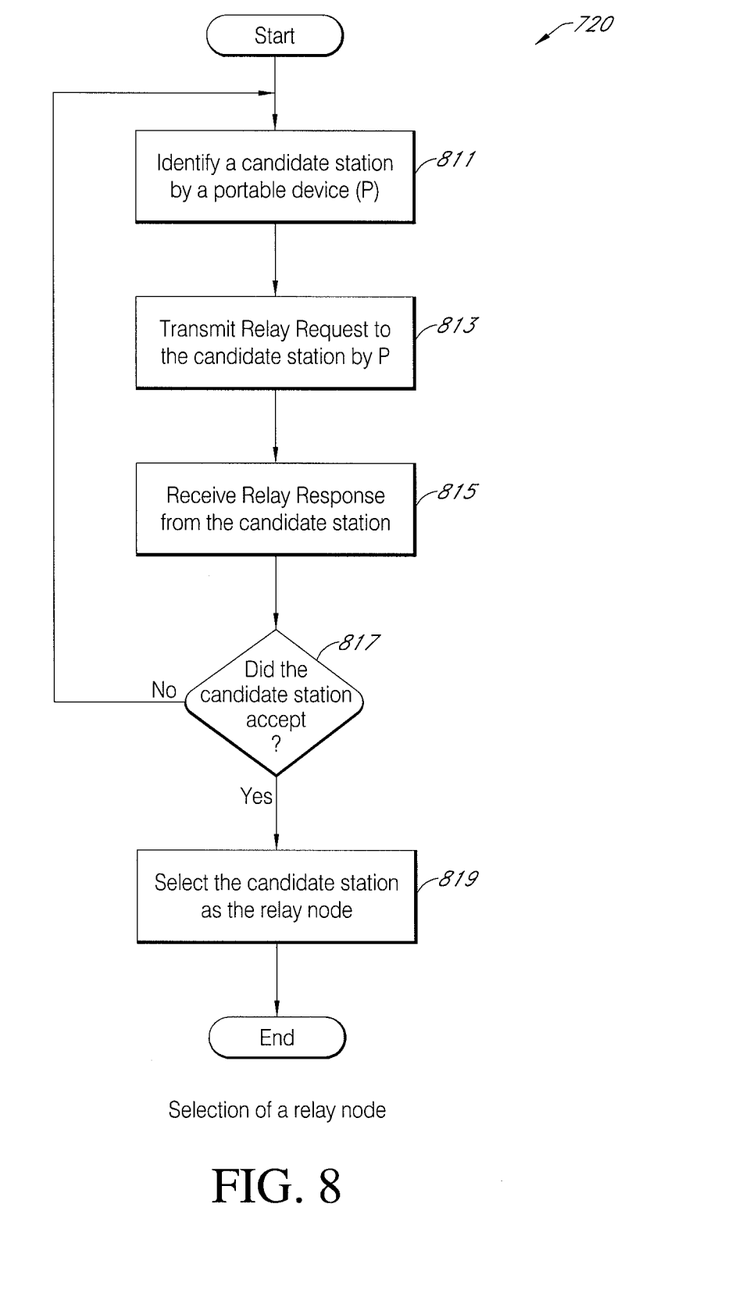
FIG. 8 is a flowchart illustrating an example process for the selection of the relay node according to certain embodiments.

FIG. 8 is a flowchart illustrating an example process 720 for the selection of the relay node according to certain embodiments. The selection process 720 starts at state 811, where a candidate station is identified among a plurality of stations in the wireless network. The candidate station is identified based at least partly on one or more of certain default criteria including, but not limited to: 1) AC power capability (for being powered by an AC power source); 2) the speed at which the station can receive or transmit A/V data; 3) video-decoding capability (for uncompressing compressed A/V data); and 4) data storage capability (for backing-up A/V data, if required, by having a data storage device, e.g., a hard disk drive). In certain embodiments, the portable device 530 (FIG. 5B) performs a discovery of available stations prior to the identification during which at least some available stations and their relevant properties including all or some of the default criteria described above are discovered. Afterwards, the portable device 530 identifies a candidate station by considering some or all of the properties. For example, if all other relevant properties of the available stations are the same, the speeds at which the available stations can receive or transmit A/V data can be the determinative factor. If the wireless network is based on the WirelessHD specification, the determinative factor can be whether the A/V data can be revived or transmitted at a higher-rate physical layer (HRP). In more typical cases where two or more properties can be different, the identification can involve various decision structures including, for example, a weighted sum of different properties or a hierarchical decision tree involving IFs and THENs. Examples of potential candidate stations include, but are not limited to: a set-up box (STB), a digital video disk (DVD) player, media servers, and the like. The process then moves to state 813, where a RelayRequest control message is transmitted to the candidate station by the portable device 530, making a request to the candidate station to become the relay node for the A/V data communication between the portable device and an intended receiver, e.g., a coordinator DTV. In certain embodiments, the gradual power incrementing scheme described in Section I above can be used to discover the candidate station and set the power level required to communicate with the candidate station. The process then moves to state 815, where a RelayReponse control message is received from the candidate station. Upon receiving the RelayResponse control message from station, the process moves to state 817, where it is determined whether the candidate station accepted the request to become the relay node. If the answer is NO, the process loops back to the beginning of the process at state 811 and, the portable device re-tries to select another relay node device. The candidate station may answer NO if it is occupied with other tasks or if it is already acting as a relay node for another portable device, for example. If the answer is YES, the process moves to state 819, where the candidate station selected as the relay node and the process ends.

The above-described method of relaying A/V data via a relay node may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk, and may also be realized in a carrier wave format (e.g., Internet transmission or Bluetooth transmission.) In some embodiments, the portable device 530, the relay node 520, or the intended receiver 510 shown in FIG. 5B includes the computer readable recording medium and can also include a processor, controller, or other computing device and a memory.

Conclusion

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of selecting an optimal transmit power level for audio/video (A/N) data transmissions by a portable device in a wireless network, the method comprising:
   transmitting a first probe message one or more times at a first transmit power level that comprises a lowest possible value;
   transmitting a second probe message one or more times at a second transmit power level that is greater than the first transmit power level, if a response to the first probe message is not received within a preset allowed response time;
   receiving a response to the second probe message from a potential relay node device; and
   selecting an optimal transmit level for subsequent A/V data transmission based at least partly on the second transmit power level, wherein the potential relay node device is identified based on power source type capability and distance range to the portable device as compared with other candidate relay node devices in the wireless network.

2. The method of claim 1, wherein the first probe message is transmitted a preset number of times if no response to an initial transmission of the first probe message is received.

3. The method of claim 1, wherein the response to the second probe message is from an alternating current (AC) powered device or an intended receiver of the A/V data.

4. A portable wireless communications apparatus for audio/video (A/V) data transmission in a wireless network, the apparatus comprising:
   a processor that selects an optimal transmit power level at least partly by transmitting a plurality of probe messages transmitted at increasing discrete transmit power levels starting at a lowest possible value until a response message for one of the probe messages is received from a potential relay node device within a preset allowed response time;
   a transmitter that wirelessly transmits the plurality of probe messages;
   a receiver that wirelessly receives the response message from the potential relay node device in the wireless network; and
   a memory for storing a value or a bit corresponding to the selected optimal transmit power level,
   wherein the potential relay node device is identified based on power source type capability and distance range to the portable device as compared with other candidate relay node devices in the wireless network.

5. The apparatus of claim 4 wherein the processor retransmits a first probe message a preset number of times at one discrete transmit power level before incrementing the transmit power level for a subsequent probe message.

6. The apparatus of claim 4, wherein the potential relay node device is an alternating current (AC) powered device in the wireless network.

7. The apparatus of claim 4, wherein the potential relay node device is an intended receiver of the A/V data.

8. The apparatus of claim 4, wherein the portable device is battery powered.

9. A method of audio/video (A/V) data communication between a portable device and an intended receiver in a wireless network, the method comprising:
   preparing a data packet that includes compressed A/V data;
   identifying a candidate station capable of directly receiving the compressed data from the portable device and relaying uncompressed A/V data to the intended receiver in the wireless network based on power source type capability and distance range to the portable device as compared with other candidate relay node devices in the wireless network;

transmitting a relay request message requesting the candidate station to become a relay node;

receiving a relay response message from the candidate station accepting the request;

selecting the candidate station as the relay node based at least partly on the relay response message; and transmitting the data packet that includes the compressed A/V data directly to the relay node.

10. The method of claim 9, wherein identifying the candidate station is based at least partly on criteria including:

AC power source type capability;
speed of data reception or transmission;
video decoding capability; and
data storage capability.

11. The method of claim 9 further comprising selecting an optimal transmit power level to communicate with the candidate station by transmitting a plurality of probe messages transmitted at increasing discrete transmit power levels starting at a lowest possible value until a response message for one of the probe messages is received within a preset allowed response time.

12. The method of claim 9, wherein the compressed A/V data is transmitted to the relay node in a current superframe, the current superframe comprising a beacon, a contiguous reserved period, and one or more non-contiguous reserved periods.

13. The method of claim 12, wherein the compressed A/V data is transmitted during the contiguous reserved period.

14. The method of claim 13, wherein the portable device goes into a power-saving sleep state when the compressed A/V data is fully transmitted before the end of the contiguous reserved period.

15. A portable wireless communications apparatus for audio/video (A/V) data transmission in a wireless network, the apparatus comprising: a processor configured to:

prepare a data packet that includes compressed A/V data;

identify a candidate station for a relay node capable of directly receiving the compressed data from the portable wireless communications apparatus and relaying uncompressed A/V data to the intended receiver based on power source type capability and distance range to the portable device as compared with other candidate relay node devices in the wireless network;

send a relay request message to the candidate station requesting the candidate station to become the relay node;

receive a relay response message from the candidate station accepting the request;

select the candidate station as the relay node; and transmit the compressed A/V data directly to the relay node; and a transmitter that wirelessly transmits the data packet that includes the compressed A/V data directly to the relay node.

16. The apparatus of claim 15, wherein the processor is further configured to identify the candidate station based on one or more of criteria including:

AC power source type capability;
speed of data reception or transmission;
video decoding capability; and
data storage capability.

17. The apparatus of claim 15, wherein the processor selects an optimal transmit power level to communicate with the candidate station by transmitting a plurality of probe messages transmitted at increasing discrete transmit power levels starting at a lowest possible value until a response message for one of the probe messages is received within a preset allowed response time.

18. The apparatus of claim 15, wherein the portable wireless communications apparatus is battery powered.

19. A method of relaying audio/video (A/V) data between a portable device and an intended receiver in a wireless network, the method comprising:

receiving a request from a portable device to become a relay node for relaying A/V data between the portable device and an intended receiver, wherein the relay node is identified based on power source type capability and distance range to the portable device as compared with other candidate relay node devices in the wireless network;

transmitting a relay response message indicative of accepting the request to the portable device;

the relay node receiving compressed A/V data directly from the portable device;

uncompressing the compressed A/V data by the relay node; and transmitting the uncompressed A/V data to the intended receiver, wherein the portable device transmits the A/V data at a lower power level than if the portable device communicated directly with the intended receiver.

20. The method of claim 19, wherein the reception of the compressed A/V data and the transmission of the uncompressed A/V data occur within the same superframe cycle.

21. The method of claim 19, wherein the transmission of the uncompressed A/V data occur after a delay of one or more superframe cycles from the reception of the compressed A/V data.

22. The method of claim 19, wherein the relay node reserves bandwidth for the A/V data communication between the portable device and the relay node, and between the relay node and the intended receiver.

23. The method of claim 19 further comprising backing-up the compressed A/V data in a data storage device by the relay node.

24. The method of claim 1, wherein the network comprises a wireless personal area network (WPAN).

25. The method of claim 9, wherein the candidate station is located a distance closer to the portable device than the intended receiver.

26. The method of claim 25, further comprising:

the portable device performing discovery of available stations for selection as a candidate station prior to the identifying.

27. The method of claim 10, wherein identifying the candidate station is based on a weighted sum of the criteria or a hierarchical decision structure.

28. The apparatus of claim 15, wherein the relay node is located at a closer distance to the portable wireless communications apparatus than the intended receiver.

29. The apparatus of claim 15, wherein a transfer of compressed A/V data from the portable wireless communications apparatus to the relay node occurs in a contiguous reserved period of a superframe, and transfer of uncompressed A/V data between the relay node and the intended receiver occurs in one or more non-contiguous reserved periods of the superframe.

30. The method of claim 1, wherein the A/V data comprises uncompressed High Definition (HD) A/V information.

31. The method of claim 1, wherein the potential relay node is further identified based on data storage capability.

32. The method of claim 1, wherein the portable device performs discovery of available relay stations prior to identification of candidate relay node devices.

33. The method of claim 1, wherein the optimal transmit level is set higher than the selected optimal transmit level for subsequent A/V data transmission based on transmission signal to noise ratio.

34. The method of claim 1, wherein the power source type capability comprises alternating current (AC) power capability.

35. The method of claim 1, wherein the potential relay node device is further identified based on receive/transmit speed capability.

36. The method of claim 1, wherein the potential relay node is capable of directly receiving compressed data from the portable device and relaying uncompressed A/V data to an intended receiver.

37. The method of claim 1, wherein the potential relay node device is identified based on discovered criteria, wherein the discovered criteria comprising power capability, receive/transmit speed capability, and proximity to the portable device based on minimum transmit power as compared with other candidate relay node devices in the wireless network.

38. The method of claim 26, wherein discovery comprises determining criteria of the available stations, wherein the criteria comprises AC power source type capability, speed of data reception or transmission, video decoding capability, and data storage capability.

39. The method of claim 1, wherein the distance range to the portable device as compared with other candidate relay node devices in the wireless network comprises finding a minimum range to the portable device as compared with other candidate relay node devices in the wireless network is based on probe message response time.

40. The method of claim 1, wherein selecting the optimal transmit level for subsequent A/V data transmission is based on power savings realized by transmitting uncompressed A/V data at a determined transmit power level based on proximity to the potential relay node.

41. The method of claim 1, further comprising:
transmitting further probe messages one or more times at subsequent transmit power levels greater than previous transmit power levels, if a response to prior probe messages is not received within the preset allowed response time;
wherein the optimal transmit level for subsequent A/V data transmissions is based on a particular subsequent transmit power level when a response to a particular further probe message from a potential relay node device is received within the preset allowed response time.

42. The method of claim 1, wherein the transmitting further probe messages one or more times at subsequent transmit power levels greater than previous transmit power levels is repeated unless a particular maximum power level is reached without receiving a response to any further probe messages from a potential relay node.

43. The method of claim 1, wherein the potential relay node device is identified based on a default of the potential relay node device being currently powered by an alternating current (AC) power source as opposed to being currently powered by a battery power source.

\* \* \* \* \*